(No Model.)
E. A. PEASLEY.
Cant Dog.
No. 240,609.          Patented April 26, 1881.
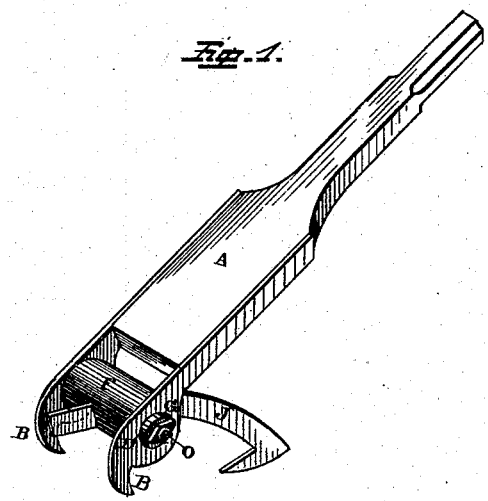
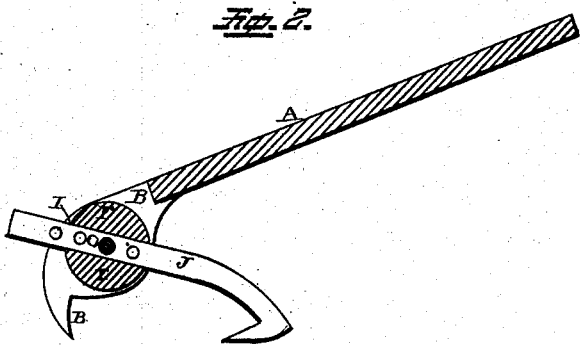

UNITED STATES PATENT OFFICE.

EDWARD A. PEASLEY, OF PANCOASTBURG, OHIO.

CANT-DOG.

SPECIFICATION forming part of Letters Patent No. 240,609, dated April 26, 1881.

Application filed March 2, 1881. (No model.)

*To all whom it may concern:*

Be it known that I, E. A. PEASLEY, of Pancoastburg, in the county of Fayette and State of Ohio, have invented certain new and useful Improvements in Cant-Hooks; and I do hereby declare the following to be a full, clear, and exact description of the invention, such as will enable others skilled in the art to which it pertains to make and use it, reference being had to the accompanying drawings, which form part of this specification.

My invention relates to an improvement in cant-hooks; and it consists in the handle or lever having two hooks secured to its lower end, and journaled in these two hooks is a roller, up through which the cant-hook is passed, and held in position by means of a bolt which passes longitudinally through the roller, as will be more fully described hereinafter.

The object of my invention is to provide a cant-hook with a series of holes through it and secure it to a revolving journal or roller, whereby the length of the hook may be increased and decreased at will.

Figure 1 is a perspective of my invention complete. Fig. 2 is a longitudinal section taken through the roller.

A represents a suitable handle or lever, which may be of any desired length, and which has secured to its lower end, by means of suitable clamping-bolts, the two hooks B. These hooks project any desired distance beyond the end of the lever, and are widened out just beyond the lever for the purpose of having openings D made through them. Before these two hooks are securely clamped to the lever by their clamping-bolts the roller F, having a journal, G, formed upon each end, is placed in between the clamps, and the two journals are passed in through the opening in the two hooks, as shown. After the two hooks are rigidly clamped in position it is evident that the roller will be securely held in position between them and yet allowed to turn freely around. Through this roller is made a hole, I, through which the upper end of the cant-hook J, having a series of holes made through it for the purpose of adjustment, is passed. Also, made longitudinally through the roller is a hole, through which is passed the bolt O, which passes through one of the holes in the cant-hook and holds the hook securely in the roller. By removing this bolt and moving the hook either up or down, it will readily be seen that the length of the cant-hook can be increased or shortened, according to the size of the log, rock, or other body upon which it is to be used. This adjustability of the hook, together with placing the hook upon a journal, so that it can freely swing back and forth, and thus adjust itself to any desired thickness, is a great improvement, and makes the hook much easier to manage than where the hook is simply pivoted to the lever in the usual manner.

Having thus described my invention, I claim—

1. In a cant-hook, the combination of the lever A, the hook J, and the roller in which the hook is held, the roller being pivoted in suitable bearings on the lever, substantially as shown.

2. The combination of the lever, the hooks secured to its end, the roller journaled in these hooks, and a cant-hook secured in the roller, substantially as described.

3. The combination of a roller with a cant-hook, provided with a series of adjusting-holes, and a bolt which passes through the roller and the handle, for the purpose of holding the hook in any desired position, substantially as set forth.

In testimony whereof I affix my signature in presence of two witnesses.

EDWARD A. PEASLEY.

Witnesses:
D. R. JACOBS,
B. F. CORKWELL.